April 25, 1944.   R. F. WALKER   2,347,305
FLUID FLOW INDICATOR
Filed Nov. 14, 1942   3 Sheets-Sheet 1
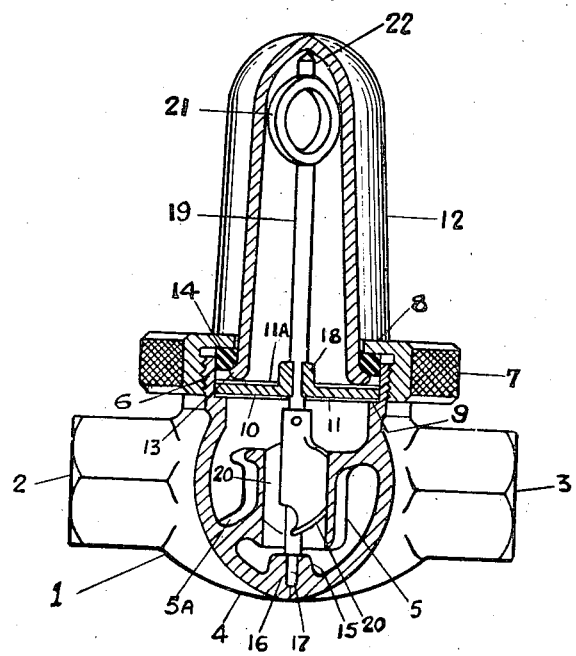
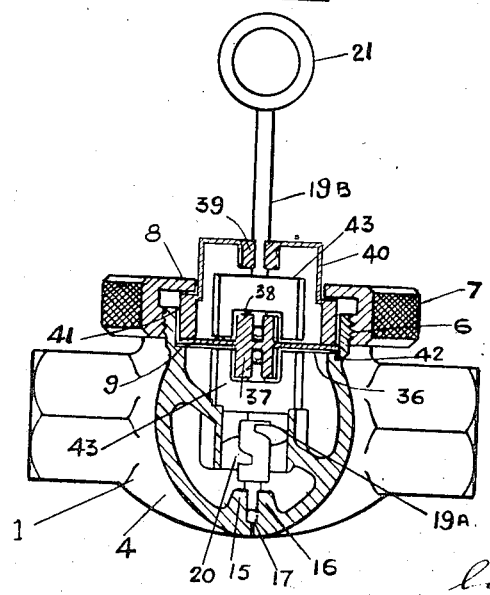
Richard F. Walker
INVENTOR
by his attorneys
Stebbins and Blenko April 25, 1944.　　　R. F. WALKER　　　2,347,305
FLUID FLOW INDICATOR
Filed Nov. 14, 1942　　　3 Sheets-Sheet 2

RICHARD F. WALKER
INVENTOR
by his attorneys
Stebbins and Blenko

April 25, 1944.   R. F. WALKER   2,347,305
FLUID FLOW INDICATOR
Filed Nov. 14, 1942   3 Sheets-Sheet 3
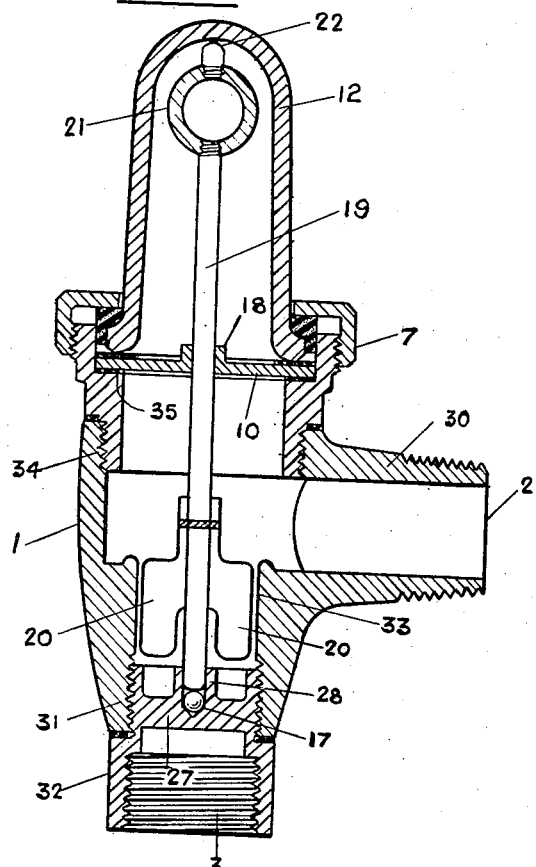
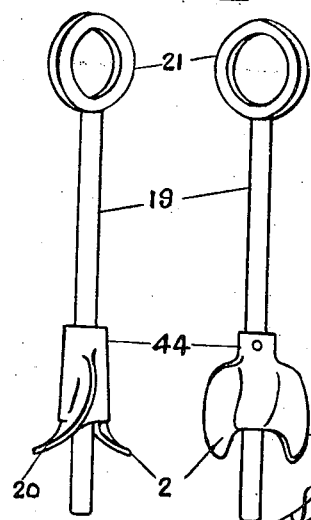
RICHARD F. WALKER
INVENTOR
by his attorneys
Stebbins and Blenko Patented Apr. 25, 1944

2,347,305

UNITED STATES PATENT OFFICE 2,347,305

FLUID FLOW INDICATOR

Richard Fife Walker, Cheltenham, England, assignor to Walker, Crosweller & Company, Limited, Cheltenham, England Application November 14, 1942, Serial No. 465,585
In Great Britain October 31, 1941

3 Claims. (Cl. 116—117)

This invention has reference to appliances for indicating whether fluid is flowing through a pipe line and, at the same time, giving an approximate indication as to the rate of such flow.

The invention is concerned with the type of indicator which comprises a body portion of tubular formation adapted to be connected in a fluid pipe-line and serving as a passage through which the fluid may flow, the said body containing a rotor which is located in the fluid passage and is carried by a spindle projecting from the body. Thus, as fluid flows along the pipe line and through the tubular body, it causes the rotor and spindle to rotate and, as the latter is readily visible, serves as a convenient means for indicating whether or not the fluid is in motion and the speed of its rotation gives a rough indication as to the rate of flow of the fluid.

One object of the invention is to provide an improved construction of indicator wherein an effective drive is imparted to the rotor.

Another object of the invention is to prevent fluid escaping from the body through the spindle opening even when the fluid is under pressure.

Another object of the invention is to enable the indicator to operate satisfactorily whether the spindle is located vertically upwards or downwards or at any position intermediate these vertical positions.

A still further object of the invention is to provide indicators suitable for insertion in vertical or horizontal pipe lines or at a bend in the line.

Other features of the invention will be set forth hereafter.

In the accompanying drawings, in which various embodiments of the invention are shown, Figure 1 is an elevation, partly in section, of an indicator particularly adapted for insertion in a horizontal pipe line.

Figure 3 is another modified construction which enables an indicator to be set into a pipe line at a bend or angle, whereas Figure 4 shows an elevation, partly in section, of an indicator particularly adapted for use in pipe lines carying fluid under pressure.

Figure 5 shows two views, taken at different angles, of one form of rotor and spindle assembly.

Figure 2:
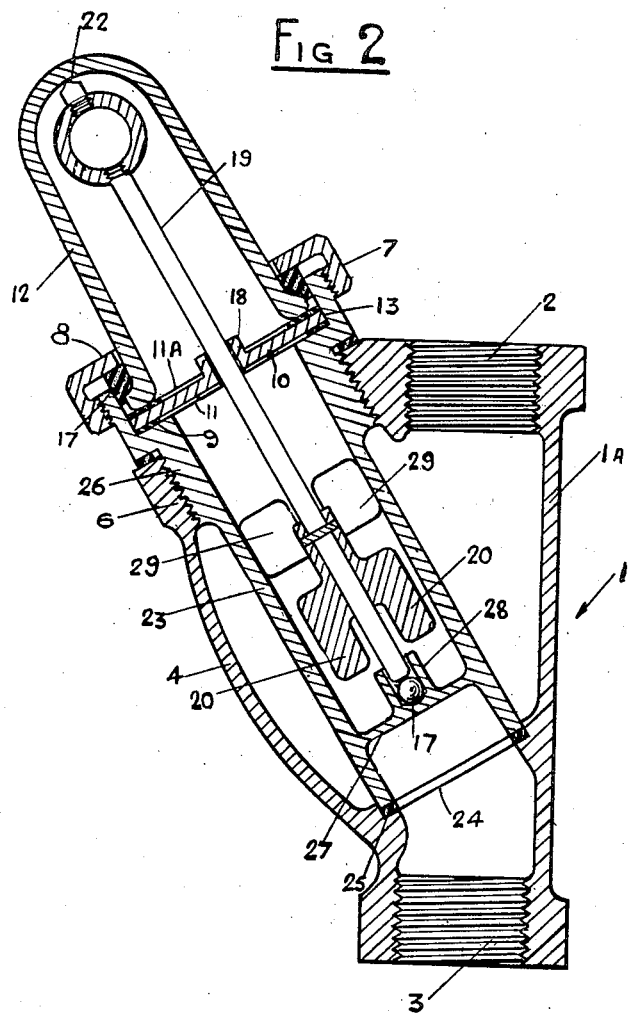
Figure 2 is a sectional elevation of a modified construction of indicator for insertion in a vertical pipe line.

The flow indicator shown in Figure 1 comprises a body 1 having aligned or coaxial inlet and outlet ports or apertures 2 and 3 respectively. These ports provide communication with the opposite ends of a body enlargement 4 in which there is provided a chamber or housing 5. The said chamber or housing is carried in a partition 5ª which extends, at an angle, transversely of the body enlargement to divide the latter into two portions, the chamber being located vertically within the partition so that its ends open one above and the other below the said partition. The inclination of the partition is such that its lowest edge is adjacent the inlet port 2 and its highest edge is adjacent the outlet port 3. The top of the enlargement 4 is formed with an opening 6 and is screw-threaded externally to take a collar 7 formed internally with a flange 8. The inside of the opening is formed with an annular shoulder 9 whereon the periphery of a disc 10 seats, rubber or similar washers 11, 11ª, being provided on the opposite faces of the said disc. The mouth of a transparent dome 12 seats upon the washer 11ª on the upper face of the disc and the said dome extends upwardly through the collar 7. The mouth of the dome is formed externally with an annular lip 13 and a washer 14 made of rubber or other compressible material, is interposed between the said lip and the flange 8 of the collar 7. Thus by screwing down the said collar 7 on to the body, fluid tight joints are created by the washers 11, 11ª and 14, between the shoulder 9, disc 10, dome 12, and flange 8.

A boss 15, having a pocket 16, is formed in the bottom of the body enlargement 4, and a ball bearing 17 is located within the said pocket. The disc 10 is formed with a journal bearing 18 which is located vertically above the pocket 16. A spindle 19 seats upon the bearing 17 and extends through the chamber or housing 5 and the journal bearing 18 into the dome 12; thus the spindle is free to rotate.

Propeller blades 20 are formed or provided upon the spindle within the chamber 5, the said blades being of such dimensions that they extend close to the wall of the said chamber, just sufficient clearance being provided to enable the blades to travel freely around the chamber. Within the transparent dome 12, the spindle 19 is provided with means, such as a ring 21, serving to give a ready visual indication as to whether the spindle is rotating. The spindle extends to, and contacts with, the crown of the dome 12, its end 22 being tapered to a point to provide a frictionless bearing; thus if the indicator should be assembled in an inverted position, with the dome located below the body 1, or a reversal of fluid flow takes place, the spindle is prevented from being displaced longitudinally, so as to bring the hub of the blades 20 into contact with the disc 10 and cause frictional resistance to the rotation of the spindle.

Finally, the inlet ports are screw-threaded internally to enable the indicator to be connected into a pipe line.

Thus, as fluid is passed through the pipe line it flows through the inlet port 2 into the body enlargement 4 above the partition 5ª and, as the only outlet is through the chamber 5, it passes through the latter over the propeller blades 20, to the underside of the partition and thence through the outlet port 3.

The passage of the fluid over the propeller blades causes the latter to travel round the chamber and rotate the spindle 19, and, therefore, the ring 21. The rotation of the said ring is readily visible through the transparent dome 12, thereby providing a visible indication that fluid is flowing through the pipe line into which the indicator is inserted. The fluid tight seals provided by the washers 11, 11ª, and 14, prevent fluid escaping from the body enlargement 4. Moreover, the washers also prevent air leaks from the glass dome, thus fluid is unable to enter the said dome through the bearing 18 to any material extent so that the ring cannot be obscured.

The provision of a slight clearance only between the propeller blades and the wall of the chamber 5 ensures that the spindle will be rotated whatever the rate of flow of the fluid and moreover ensures that the speed of rotation will be proportional to the said rate of flow. Hence the rate at which the ring 21 is rotated may also serve for giving an approximate indication of the rate of flow.

The downward flow of the fluid through the chamber 5 imposes a force on the propeller blades which tends to force the spindle 19 on to the ball bearing 17, thereby reducing frictional losses to a minimum.

The relative dispositions of the partition 5ª, chamber 5 and pocketed boss 15, are such that these integers and the body 1 may be produced as a single casting.

In the modified application of the invention shown in Figure 2, which is also disclosed and claimed in my copending application Serial No. 481,976, filed April 6, 1942, as a division hereof, the body 1 of the indicator comprises a tubular portion 1ª having tapped inlet and outlet ports, 2 and 3 respectively, which are in co-axial alignment. The body also comprises an enlargement 4 having a tapped opening 6, the axis of said opening being inclined to the axis of the tubular body portion 1ª, a sleeve 23 being inserted into said opening and being arranged to seat in a fluid-tight manner upon a compressible washer 24 located on an annular shoulder 25 formed in the tubular portion 1ª at right angles to the axis of the opening 6. The sleeve is adapted to be secured in the position which effects the said fluid-tight seal by providing a screw thread externally of a portion 26, adjacent its upper end, which is of enlarged diameter and engages the tapping in the opening 6. Outwardly of the said threaded portion 26, the sleeve is of still greater diameter and is formed with an internal shoulder 9 for receiving a disc 10 having sealing washers 11 and 11ª applied to its opposed faces. The outer end of the sleeve is screw-threaded externally and receives a collar 7 which is adapted to clamp a transparent dome 12 on to the disc 10 in a fluid-tight manner through the intermediary of the annular flange 8, compressible washer 14, and dome lip 13.

Internally, the sleeve 23 is formed at its inner or lower end, with a spider 27 for supporting a cup 28 co-axially in the sleeve in alignment with a central bearing 18 in the disc 10. A ball bearing 17 is located in the bottom of this cup and serves as a substantially frictionless seating for the end of the bladed spindle 19 which extends upwardly through the bearing 18 to the crown of the dome 12, where it is tapered to a point 22 contacting, in a substantially frictionless manner, with the said crown.

Intermediate the enlarged portion 26, and the spider 27, the sleeve is formed with a system of ports 29 which serve as the only means whereby fluid entering the body of the indicator through the port 2, may pass to the outlet port 3. Intermediate the ports 29 and spider 27, the spindle is provided with propeller blades 20 between the edges of which and the wall of the sleeve, a slight clearance is provided. Thus fluid entering the sleeve through the ports 29, will rotate the spindle 19 in the same manner and with the same effect as in the indicator shown in Figure 1.

In the modified construction of indicator shown in Figure 3, the body 1 is formed with a lateral tubular arm 30, which is externally screw-threaded to adapt it for connection to a pipe line and serves as the fluid inlet 2. The bottom of the body is apertured and tapped for receiving a threaded neck 31 of a tubular adapter 32 which serves as the fluid outlet 3. The adapter is tapped for receiving a pipe line and is located at right angles to the arm 30. The neck 31 is provided with a spider 27 which carries the cup 28 for receiving the ball bearing 17 wherein the end of the bladed spindle 19 seats. The blades 20 on the said spindle are located within a chamber 33 provided within the body 1, a slight clearance being provided between the edges of the said blades and the chamber walls.

A second tubular adapter is screwed into an opening 34 in the top of the body 1, this adapter being provided internally with an annular seating 35 for the washered disc 10 having the central spindle bearing 18, and being externally screw-threaded for receiving the clamping collar 7 of the transparent dome 12. The spindle 19 extends to the crown of the dome, which it contacts by the tapered end 22, and carries the ring 21, for giving the visible indication of the rotation of the said spindle, within the said dome. Thus, the arrangement is again such that the slowest flow of fluid through the indicator, will cause rotation of the spindle.

If any of the indicators shown in Figure 1, 2, or 3, were to be incorporated in a high pressure pipe line, fluid would probably seep into the transparent dome thereby not only offering an obstruction to the rotation of the spindle and indicating ring, but also hiding (in the case of oils and other opaque or translucent fluids) the said ring from view. Moreover, if the pipe line should be utilised for carrying high-pressure gas or steam, the interior of the dome would eventually attain pipe line pressure and, in the event of the dome failing or being accidentally broken, glass would be flung in all directions and the indicator would, therefore, be a potential danger to personnel.

The modified construction of indicator shown in Figure 4, overcomes these difficulties. In this arrangement the body 1 is similar to the body shown in Figure 1. The essential difference is that the spindle 19 of Figure 1 is divided into two separate parts 19ª and 19ᵇ, the lower part 19ª being located within the body enlargement 4 and being provided with the propeller blades 20, whereas the part 19ᵇ is located on the opposite side of a disc 36 and is provided with the visible indicating ring 21. The said disc is made of non-magnetic material and is provided centrally, on its opposed faces, with cups 37 and 38, each of which houses a ball bearing. The cup 37 receives the upper end of the spindle 19ᵃ, the lower end of which enters a pocket 16 in the boss 15 formed in the base of the body 1 and seats upon a ball bearing 17 housed within the said pocket. The cup 38 receives the lower end of the spindle 19ᵇ which seats upon the ball housed within the said cup and is held vertical by a journal bearing 39 provided in the crown of a dome 40.

The dome 40 is shouldered internally at 41, the said shoulder being engaged by the flange 8 of the clamping collar 7. Thus the dome is thrust on to the disc 36 and effects a tight joint between the latter and the annular seating shoulder 9 within the body opening 6; the fluid tightness of the said joint is preferably ensured by interposing a washer 42 between the disc 36 and shoulder 9.

To enable drive to be transmitted from the spindle 19ᵃ, upon passage of fluid through the chamber 5, to the spindle 19ᵇ, each spindle is provided at its end adjacent the disc 36, with a magnet 43 of horse shoe design, the poles of the said magnets being located close to the faces of the disc. If desired, a transparent dome may be arranged to enclose the indicating ring.

It will be noticed, that in the construction shown in Figure 4, there is no spindle passage through the disc as in the constructions shown in Figures 1-3, and, therefore, no leakage of fluid from the body 1 can take place, however high its pressure may be.

In each of the various modified indicators shown in Figures 1-4, the propeller blades 20 are formed on, or connected to, a sleeve or boss 44 which is keyed to the spindle 19 (or 19ᵇ). The propeller may comprise a spiral blade as shown in Figure 4 in which case it may be produced from a split washer and secured to the said sleeve, the washer being opened to any desired extent to modify the pitch of the propeller to render the latter suitable for use according to the rate of flow which it is expected will flow through the indicator. Alternatively, as shown in Figure 5, the propeller 20 and sleeve 44 may be produced as a single casting, the pitch of the blades 20 being predetermined according to the anticipated rate of flow through the indicator in which the said casting is to be assembled; such a propeller construction is shown in Figures 1, 2, and 3.

Having described my invention what I claim and desire to secure by Letters Patent is:

1. A flow indicator comprising a body having fluid inlet and outlet ports, an internal chamber through which the fluid is constrained to flow between said ports, an enlargement in which said chamber is carried by a partition which divides said enlargement into separate compartments, a pocketed boss located co-axially with the chamber on one side of the partition and containing a ball bearing, a body opening located co-axially with the chamber on the other side of the partition, a disc having a central journal bearing, seated on an annular shoulder within said opening, a transparent inverted dome on said disc, means for effecting fluid tight joints between said dome, disc and seating, a spindle seated on one end on said ball bearing and extending through said chamber, journal bearing and body opening into contact with the crown of said dome, propeller blades carried by said spindle within said chamber and spindle carried means housed within the dome for indicating when the said spindle is rotated by the flow of fluid through the chamber over the blades.

2. A flow indicator comprising a hollow body having fluid inlet and outlet ports, a transverse partition dividing the interior of the body into portions communicating with said ports, respectively, an internal chamber formed in said partition through which the fluid is constrained to flow, an opening into said body formed with an internal annular seating, a rotatable spindle extending coaxially of said chamber and through said opening to the outside of the body, a disc located on said seating and having a central bearing for said spindle, means for clamping said disc on said seating in a fluid-tight manner, propeller blades on the spindle within said chamber with a clearance between their edges and the chamber wall, and visible means carried by the spindle externally of the body for indicating when the spindle is rotated by the flow of fluid through said chamber over said blades.

3. A flow indicator as defined by claim 2 characterized by an inverted transparent dome on said disc, means for effecting fluid-tight joints between said dome and disc, said spindle extending into contact with the crown of said dome, thereby preventing axial shift of the spindle relative to said central bearing.

RICHARD FIFE WALKER.